United States Patent [19]

Kappelmüller et al.

[11] Patent Number: 5,800,843
[45] Date of Patent: Sep. 1, 1998

[54] APPARATUS FOR INJECTION MOLDING PLASTIC MATERIAL

[75] Inventors: Werner Kappelmüller; Heinz Leonhartsberger, both of Schwertberg, Austria

[73] Assignee: Engel Maschinenbau Gesellschaft m.b.H., Schwertberg, Austria

[21] Appl. No.: 776,872

[22] PCT Filed: Aug. 10, 1995

[86] PCT No.: PCT/AT95/00162

§ 371 Date: Feb. 7, 1997

§ 102(e) Date: Feb. 7, 1997

[87] PCT Pub. No.: WO96/05041

PCT Pub. Date: Feb. 22, 1996

[30] Foreign Application Priority Data

Aug. 11, 1994 [AT] Austria .................. GM 237/94 U

[51] Int. Cl.⁶ .................................................. B29C 45/80
[52] U.S. Cl. .................. 425/150; 425/450.1; 425/451.2; 425/589; 425/590
[58] Field of Search .................. 425/589, 149, 425/590, 450.1, 451.2, 150

[56] References Cited

U.S. PATENT DOCUMENTS

| 5,249,951 | 10/1993 | Leonhartsberger et al. | 425/589 |
| 5,354,196 | 10/1994 | Ziv-Av | 425/589 |
| 5,478,231 | 12/1995 | Hehl | 425/589 |
| 5,556,656 | 9/1996 | Lampl et al. | 425/589 |
| 5,633,024 | 5/1997 | Ziv-Av | 425/589 |

FOREIGN PATENT DOCUMENTS

| 849655 | 7/1949 | Germany . |
| 0311133 | 10/1988 | Germany . |
| 9212480 | 9/1992 | Germany . |
| 63286316 | 3/1989 | Japan . |
| 9504643 | 2/1995 | WIPO . |

*Primary Examiner*—Tim Heitbrink
*Attorney, Agent, or Firm*—Notaro & Michalos P.C.

[57] ABSTRACT

An apparatus for injection molding thermoplastic material has mold halves carried by stationary and movable mold mounting plates which are mounted on a frame. A control mechanism actively applies a variable torque to one of the mold mounting plates for compensating for any bending of the frame due to the closing force applied between the mold halves.

10 Claims, 4 Drawing Sheets

APPARATUS FOR INJECTION MOLDING PLASTIC MATERIAL

FIELD AND BACKGROUND OF THE INVENTION

The invention relates to an apparatus for injection molding thermoplastic materials, comprising a substantially C-shaped frame which is bent open by the closing force produced by a closing device between the mold halves carried respectively by a stationary and a movable mold mounting plate, wherein the angle between at least one mold mounting plate and the associated limb of the frame is variable.

Several apparatuses of that kind have been proposed in recent times (see for example DE-U 92 12 480.1). In that respect the pivotal mounting of at least one of the mold mounting plates serves the purpose of making the orientation of that plate independent of deformation phenomena in respect of the associated vertical limb of the machine frame, as can occur in relation to machines without a connecting beam member. If each mold mounting plate has a pivot, then when the closing pressure is applied the two mold mounting plates and the mold halves secured thereto retain their orientation in space while the limbs of the frame bend outwardly. A particularly simple structure is shown in EP-B2 311 133 in which only the movable mold mounting plate is mounted tiltably. In this case the condition of plate parallelism is achieved by virtue of the fact that the movable mold mounting plate accompanies the stationary mold mounting plate in its pivotal movement. The angle through which the pivot pivots thus corresponds to the sum of the pivotal movements of the two vertical limbs of the machine frame.

In conventional machines the movable mold mounting plate is pressed during the procedure by spring force against an abutment which vertically orients the plate so that the two mold halves are already in an exactly parallel position when they meet each other. The moment applied to the pivot by the weight of the movable mold mounting plate is therefore at least compensated by the spring. If then the frame experiences deformation when the closing force is applied, a moment must be applied to the pivot, which moment moves the pivot. In that arrangement, the structure of the pivot is not an important consideration: if it involves a pin or the like which is movable in a bearing shell, the bearing friction has to be overcome, while if the frame and the mold mounting plates are connected by a deformable intermediate member, work has to be done against the elasticity thereof. In known apparatuses there are only passive machine elements such as springs and immovable abutments in the pivot region so that the additional moment for producing the pivotal movement upon deformation of the machine frame must be produced by the mold initially being compressed to a greater degree by the closing force in the lower region than in the upper region. That admittedly makes it unnecessary to have a separate control as the same closing force which deforms the frame also turns the pivot, but the movement only begins when there is a given minimum degree of deformation of the machine frame and the mold.

SUMMARY OF THE INVENTION

The object of the present invention is deliberately and specifically to influence the angle between the mold mounting plate and the frame, in which respect the properties of the mold are to be of minimum significance.

That object is attained in that there is provided a controllable means, by the actuation of which a torque increasing the angle between the mold mounting plate and the frame is applied to or rendered operative on the mold mounting plate.

In the simplest case the application of an additional torque upon an increase in the closing force is effected by release of an abutment which during the movement of the mold mounting plate has prevented it from turning under the influence of its own weight. That means that the weight of the plate becomes operative in the sense of moving the pivot.

In a further configuration of the invention it can be provided that the means for influencing the plate orientation is in the form of a setting means which is provided with a drive and which actively turns the mold mounting plate into the desired angular position.

Further details of the invention are described hereinafter by means of embodiments.

BRIEF DESCRIPTION OF THE DRAWINGS

An embodiment of the invention is described in detail hereinafter with reference to the figures of the accompanying drawings.

DESCRIPTION OF THE PREFERRED EMBODIMENTS

Figure 1:
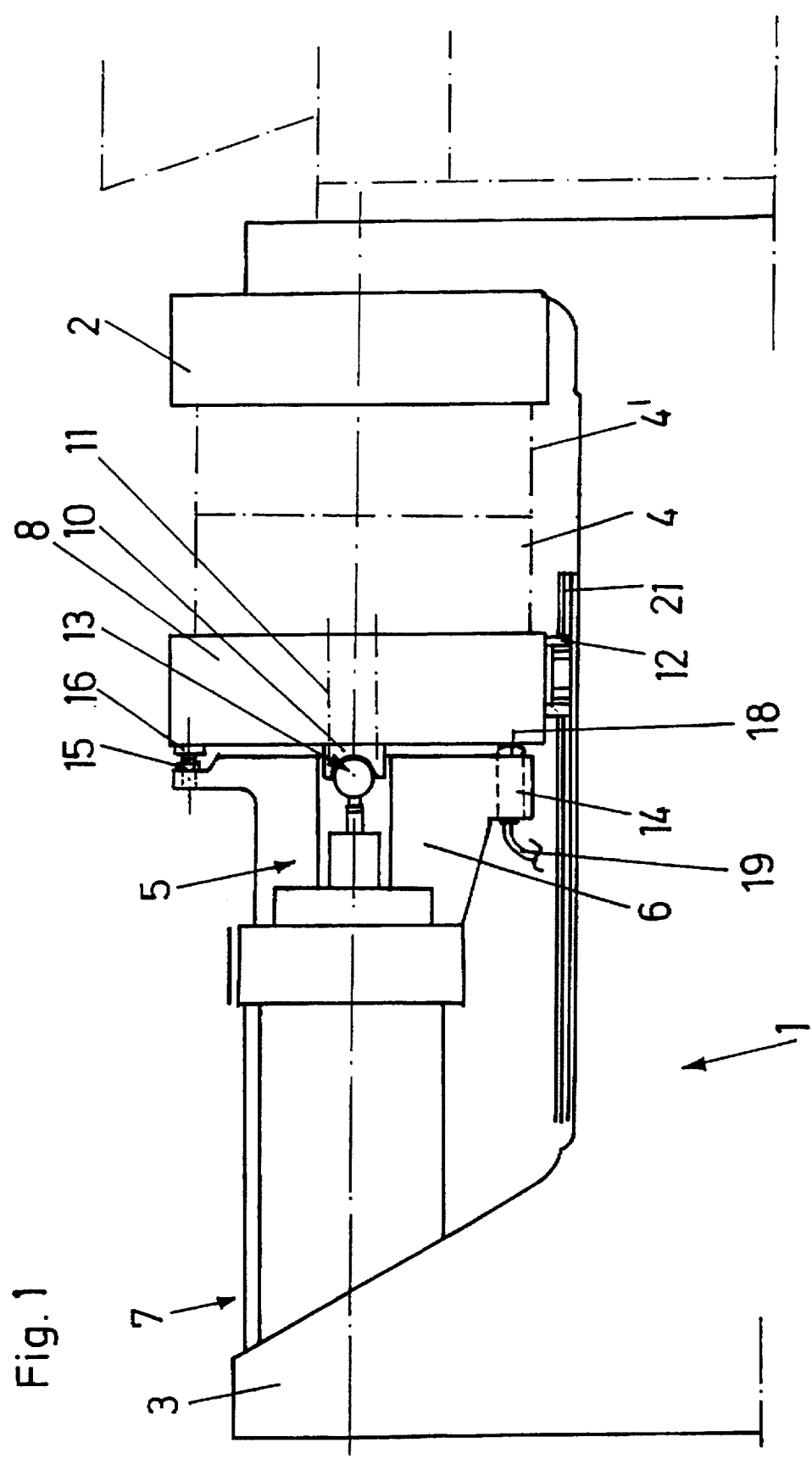
FIG. 1 is a side view of a first embodiment of an injection molding machine according to the invention.
Figure 2:
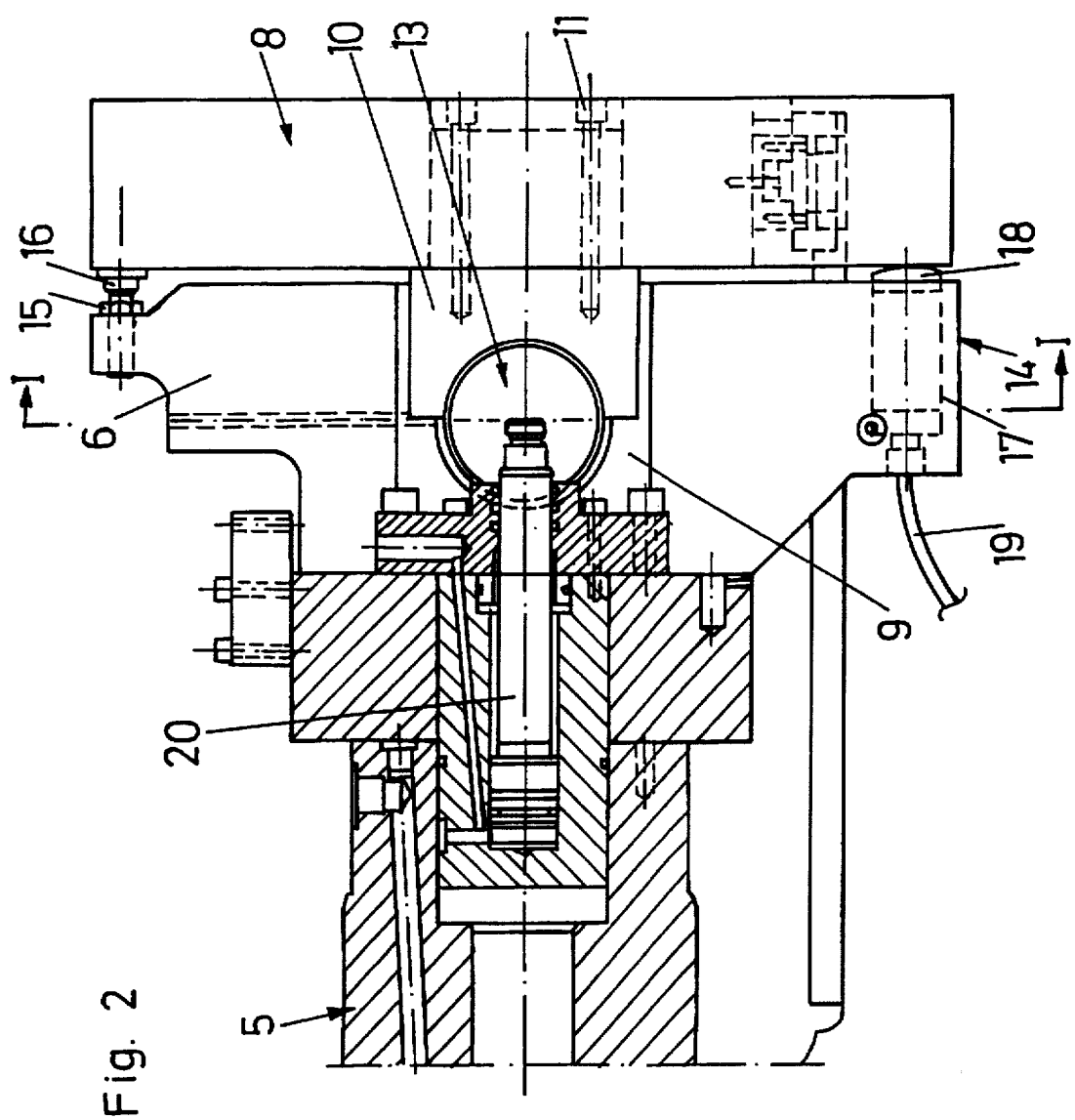
FIG. 2 is a side view of the movable mold mounting plate and the closing piston, the closing piston being shown partly in section.
Figure 3:
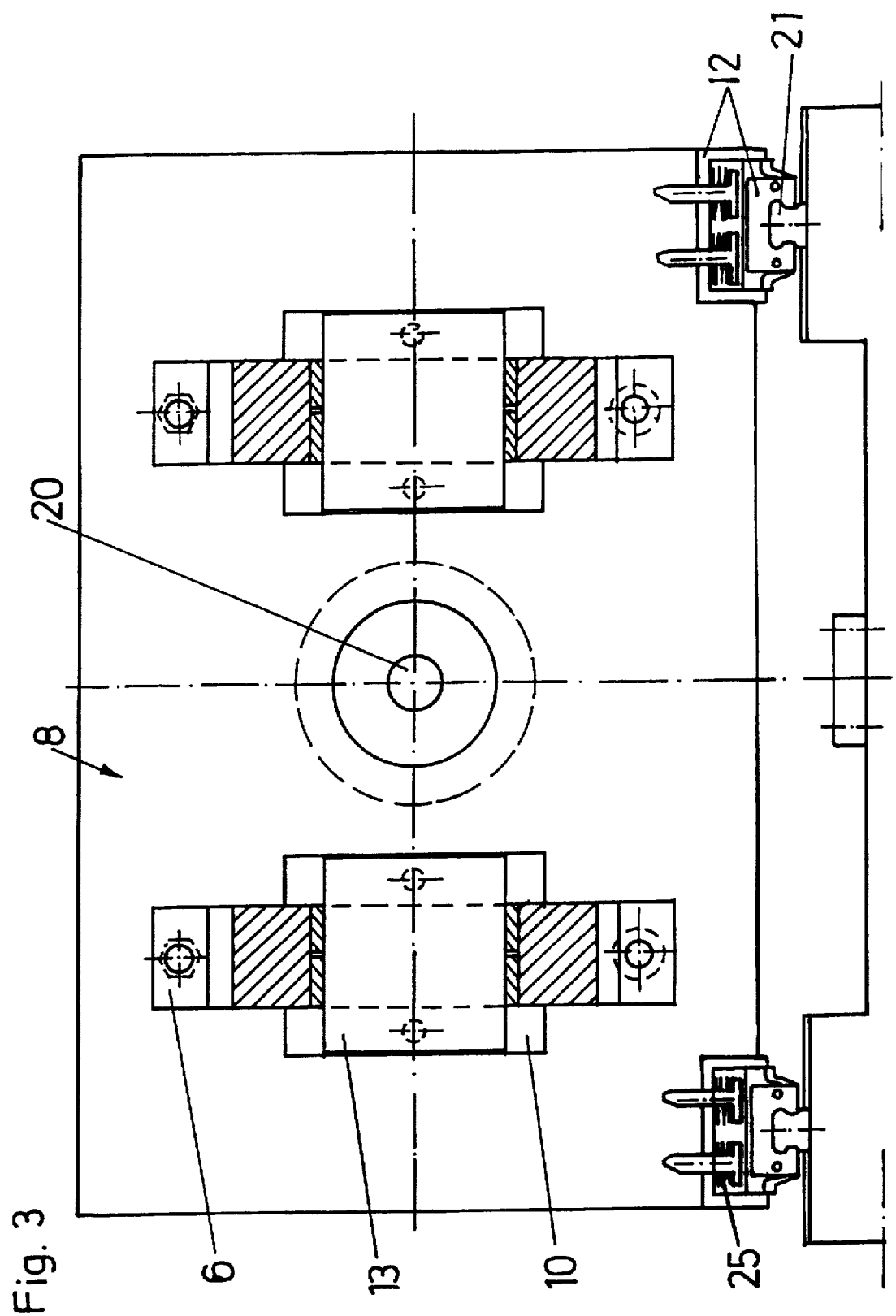
FIG. 3 shows the section I—I in FIG. 2.

An essential part of the injection molding machine shown in FIGS. 1 through 3 is the machine frame 1 which is produced integrally with the stationary mold mounting plate 2 and the cylinder plate 3, that is to say the mold mounting plate 2 and the cylinder plate 3 are formed on or fixedly mounted on the machine frame 1. The injection unit with the feed hopper for the feed of granular material is mounted on the mold mounting plate 2.

The injection unit will not be further described in this context, it does not form subject-matter of the present invention and is produced in accordance with the state of the art.

The cylinder plate 3 carries a piston-cylinder unit 7 whose piston 5 is connected to the movable mold mounting plate 8 and which forms the closing mechanism.

The mold mounting plates 2, 8 carry the mold halves 4, 4'.

During the injection procedure the movable mold mounting plate 8 is held with the mold half 4 against the mold half 4' of the stationary mold mounting plate 2, by means of the piston-cylinder unit 7.

In the case of a closing unit in which a high closing force is transmitted exclusively by way of the frame 1, without involving a connecting beam member, a pivot 13 prevent an opening movement in the upper region of the tool, that is to say between the two mold halves 4, 4'. By virtue of that pivot 13, the movable mold mounting plate 8 with its mold half 4 can bear in parallel relationship against the stationary mold mounting plate 2 with the associated mold half 4', when a high closing force is produced, even if the stationary mold mounting plate 2 tilts rearwardly.

In the illustrated embodiment the closing piston 5 carries two support plates 6 at its front end. Disposed beside the support plates 6 are bearing holders 10 of the movable mold mounting plate 8, which carry the bearing shells for the pivot 13. The bearing holders 10 are screwed by means of screwthreaded bolts 11 to the movable mold mounting plate 8.

At the upper edge the support plates 6 are provided with adjustable abutments 15 which bear against the movable mold mounting plate 8.

Provided at the lower edge of the support plate 6 is at least one abutment 14 which however is adjustable or releasable and which in the illustrated embodiment is formed by a hydraulic cylinder 17 with a piston 18. The hydraulic cylinder 17 is connected by way of lines 19 to a hydraulic pump (not shown).

The movable mold mounting plate 8 is guided by means of sliding shoes 12 on rails 21 mounted on the machine frame 1. The sliding shoes 12 are admittedly held on the rails 21 by positively locking engagement therewith, but they permit a short resilient lifting movement of the mold mounting plate 8 in the event of a very high closing pressure, against the action of spring assemblies 25.

FIG. 2 also shows the hydraulic ejector 20 in the closing piston 5.

In the injection procedure the movable mold mounting plate 8 is firstly arrested by the abutments 14, 15 in relation to the support plate and cannot perform a rotary movement about the pivot 13.

When the closing pressure rises or when the actual molding pressing pressure is produced in the injection molding operation, the abutment 14 is released, that is to say the pressure at the piston 18 in the cylinder 17 is reduced and the movable mold mounting plate 8 can perform a slight rotary movement in the clockwise direction in order to adapt to the rearwardly tilted stationary mold mounting plate 2 and maintain the condition of parallelism of the mold.

In that case the cylinder 17 is connected by way of the lines 19 to a pump controlled by a control which activates the pump in dependence on the closing pressure of the closing piston 5.

Figure 4:
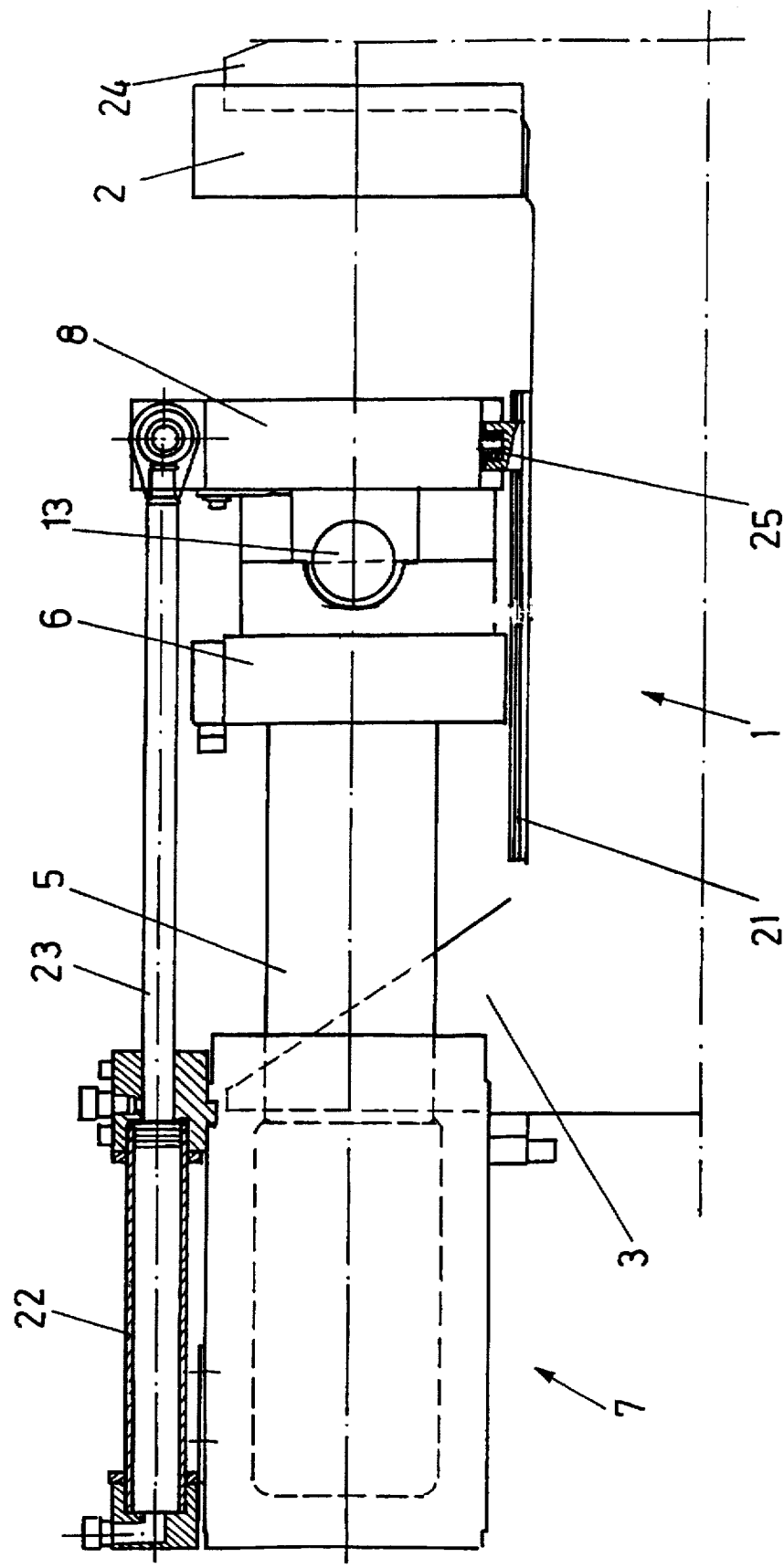
FIG. 4 is a vertically sectioned side view of a second embodiment of the invention.

The embodiment shown in FIG. 4, in addition to the piston-cylinder unit 7 which applies the closing pressure, has in known manner a rapid-motion stroke cylinder 22 with hydraulically actuated piston 23. In accordance with the state of the art that piston 23 would be fixed to the support plate 6. In accordance with the invention however the piston 23 engages the movable mold mounting plate 8 and can thus rotate it about the pivot 13 as soon as the closing force pivots in the clockwise direction the stationary mold mounting plate 2 which is fixed to the associated limb 24 of the frame 2. As a result the movable mold mounting plate 8 can also accompany the stationary mold mounting plate 2 in its pivotal movement and the mold halves which are mounted between those two plates remain exactly parallel to each other.

Both embodiments of the invention ensure that a mold mounting plate which is pivotable relative to the associated limb of the frame is oriented parallel to said limb of the frame during the closing and opening movement and, when the closing force is applied, is subjected to the influence of a torque which promotes setting of the desired angle between the limb of the frame and the mold mounting plate. In order to achieve the desired magnitude of the additional torque, it will generally be sufficient to provide a simple control, at any event when the frictional force which acts in the pivot 13, the weight of the tool which acts in the clockwise direction, and the force of the spring 25 which acts between the sliding shoe 12 and the mold mounting plate 8 in the direction of lifting off the mold mounting plate 8 are known. On the other hand however it is readily possible to calculate the angle through which the pivot 13 is to move with a given closing force and thus with a given flexural opening movement of the frame 1 and with a given mold height. If thus as in the embodiment shown in FIG. 4, there is a device for actively applying an adjustable torque to the mold mounting plate, not only is it possible to set the desired value of the torque, in the sense of a control action, but it is also possible to provide a regulation effect to achieve the desired angle of rotation of the pivot. The pressure in the rapid-motion stroke cylinder 22, 23 could also be selectively varied until, after rotation of the pivot 13, the two mold mounting plates are uniformly loaded or extend exactly parallel to each other.

It will be appreciated that the hydraulic piston which actively exerts a torque about the pivot 13 does not have to be part of the hydraulic unit which is responsible for the rapid-motion stroke movement. Particularly if an asymmetrical rapid-motion stroke device is not wanted, a hydraulic unit which is operative between the support plate 6 and the mold mounting plate 8 can preferably be arranged at the upper edge of those plates. If the assembly has a return spring 25, it is sufficient if such a hydraulic unit can move the mold mounting plate 8 from the normal position into the tilted position by the application of a pressure.

We claim:

1. Apparatus for injection molding thermoplastic materials, comprising a substantially C-shaped frame which is bent open by a closing force produced by a closing device between mold halves carried respectively by a stationary and a movable mold mounting plate, wherein an angle between at least one mold mounting plate and an associated limb of the frame is variable, and including a controllable means, connected to the frame for applying to the at least one mold mounting plate a torque for increasing said angle between the at least one mold mounting plate and the associated limb of the frame.

2. Apparatus as set forth in claim 1 wherein the controllable means is in the form of a setting means which is provided with a drive and which actively turns the mold mounting plate into a desired angular position.

3. Apparatus as set forth in claim 2, wherein the setting means is a hydraulic piston.

4. Apparatus as set forth in claim 2, including a hydraulic unit provided in addition to the means for applying the closing force and serving to move the movable mold mounting plate is pivoted to the movable mold mounting plate itself and can be acted upon by pressure during application of the closing force.

5. Apparatus as set forth in claim 4 wherein, during the closing operation, a spring holds the mold mounting plate against the effect of its weight and the rapid-motion stroke cylinder or rapid-motion stroke piston in a normal position.

6. Apparatus as set forth in claim 1, wherein the controllable means is in the form of a releasable abutment which in a fixed condition holds the mold mounting plate parallel to the associated limb of the frame.

7. Apparatus as set forth in claim 6, wherein the abutment is a hydraulic piston.

8. Apparatus as set forth in claim 7, wherein the abutment is acted upon by a motor or a pump.

9. An injection molding machine comprising a closing mechanism having a closing piston and having an end plate wherein the end plate on which a movable mold mounting plate is supported and a stationary mold mounting plate connected exclusively by way of the machine frame, without connecting beam members, and wherein the movable mold mounting plate is mounted tiltably about a horizontal axis so that when a closing force is applied, the movable mold mounting plate is inclined parallel to the stationary mold mounting plate and for that purpose provided on the closing piston is a pivot having an abutment, which connects the closing piston to the movable mold mounting plate, and wherein the closing piston carries at least one support plate and, provided between the movable mold mounting plate and the support plate is a fixing means for temporarily fixing an angular position between the movable mold mounting plate and the support plate.

10. The injection molding machine as set forth in claim 9 including a cylinder connected to the abutment for setting a locking position in a first partial stroke movement of the closing piston and the abutment being movable out of the locking position prior to a second partial stroke movement of the clamping piston.

* * * * *